United States Patent [19]

Smith et al.

[11] Patent Number: 5,370,897
[45] Date of Patent: Dec. 6, 1994

[54] PRODUCTION OF ISOMERIZED HOP EXTRACT

[75] Inventors: Robert J. Smith, Yakima, Wash.; Richard J.H. Wilson, Copthorne, United Kingdom.

[73] Assignee: S. S. Steiner, Inc., New York, N.Y.

[21] Appl. No.: 166,741

[22] Filed: Dec. 13, 1993

Related U.S. Application Data

[63] Continuation of Ser. No. 893,524, Jun. 4, 1992, abandoned.

[51] Int. Cl.$^5$ .................................. C12C 3/00
[52] U.S. Cl. ....................... 426/600; 426/74; 426/431; 426/655
[58] Field of Search ............... 426/600, 74, 431, 655

[56] References Cited

U.S. PATENT DOCUMENTS

| | | | |
|---|---|---|---|
| 3,607,300 | 9/1971 | Mitchell | 99/50.5 |
| 3,765,903 | 10/1973 | Clarke et al. | 99/50.5 |
| 3,949,092 | 4/1976 | Mitchell | 426/16 |
| 3,952,061 | 4/1976 | Koller et al. | 260/586 |
| 4,002,683 | 1/1977 | Todd, Jr. | 260/586 D |
| 4,123,561 | 10/1978 | Grant | 426/600 |
| 4,302,479 | 11/1981 | Humphrey et al. | 426/600 |
| 4,717,580 | 1/1988 | Forrest et al. | 426/600 |
| 4,758,445 | 7/1988 | Klusters | 426/600 |
| 4,767,640 | 8/1988 | Goldstein et al. | 426/600 |
| 5,013,571 | 5/1991 | Hay | 426/600 |
| 5,015,491 | 5/1991 | Westwood et al. | 426/600 |
| 5,073,396 | 12/1991 | Todd, Jr. | 426/600 |

FOREIGN PATENT DOCUMENTS

| | | | |
|---|---|---|---|
| 474830 | 8/1974 | Australia. | |
| 0199101 | 10/1986 | European Pat. Off. | |
| 0363023 | 4/1990 | European Pat. Off. | |
| 0474892 | 3/1992 | European Pat. Off. | |
| 1158697 | 7/1969 | United Kingdom | C07C 49/60 |
| 1424786 | 3/1972 | United Kingdom | C12C 9/02 |
| 1424785 | 6/1973 | United Kingdom | C12C 9/02 |
| 1423129 | 1/1976 | United Kingdom | C12C 9/02 |
| 2022083 | 12/1979 | United Kingdom. | |

OTHER PUBLICATIONS

Pollock, J. 1979 *Brewing Science* "VIII Isomerized Hop Extracts", Academic Press, Inc. New York, vol. 1, p. 402.

Primary Examiner—Helen Pratt
Attorney, Agent, or Firm—Hayes, Soloway, Hennessey, Grossman and Hage

[57] ABSTRACT

A method for the production of isomerized hop preparation in which a hop extract is mixed with a solubilized alkaline and an alkaline earth metal salt, and the resulting mixture is subjected to a temperature of at least 70° C. and a pH under 10 for a time sufficient to effect conversion of the alpha-acid in said hop extract into the iso-alpha acid.

17 Claims, No Drawings

PRODUCTION OF ISOMERIZED HOP EXTRACT

This is a continuation of copending application Ser. No. 07/893,524 filed on Jun. 4, 1992, abandoned.

FIELD OF THE INVENTION

The present invention relates to the production of iso-alpha-acids by the isomerization of alpha acids in the form of a hop extract.

BACKGROUND OF THE INVENTION

Hop extract s have been used for many years as a flavor-additive to beer. Some advantages for using hop extracts instead of baled hops or pellets include 1) reduced freight costs, 2) improved stability and 3) a cleaner product. Hops have been extracted with such solvents as methanol, ethanol, methylene chloride, hexane and liquid carbon dioxide. Use of liquid and supercritical carbon dioxide for hop extraction gives rise to a purer extract, eliminating the problem of solvent residue.

Carbon dioxide hop extracts provide an excellent and relatively stable source of alpha acids, hop oil, and beta acids. During the boiling of the wort, the alpha acids are isomerized to the bitter, iso-alpha acids; some of the hop oil is solubilized and is believed to impart a hop aroma to the beer; the beta acids possibly provide additional bitterness.

When hop extracts are used in the kettle, the yield or conversion of the alpha acids into the iso-alpha acids in the finished beer is quite low, in the range of 20–45%. It then became generally known that the conversion of alpha acids could be improved by pre-isomerizing the alpha acids in the presence of a solid alkaline earth metal salt.

This then led to an extensive search to optimize the reaction conditions which would promote the alkaline earth metal effect on the process of isomerization. For example, in U.S. Pat. No. 5,015,491 there is reported a method for the production of an isomerized hop preparation which comprises mixing together hop extract with an alkali or alkaline earth metal compound (e.g. an oxide, hydroxide, a carbonate or other salt of Na, K, Mg or Ca), wherein the alkali or alkaline earth metal salt is used in an amount of 0.1 to 4.0 moles for each mole of total alpha-acid present in the extract, and subjecting the resulting mixtures to a temperature in the range of 80°–200° C. over a period of 0.1–15 minutes to effect conversation of alpha-acid to iso-alpha-acid. See also GB-A-8821420 and EP A 0 363 023.

In U.S. Pat. No. 5,013,571 there is reported a method of converting alpha-acids to hop flavors by exposing the alpha acids to an environment that simultaneously isomerizes and reduces the alpha-acids to form either tetrahydroisoalpha-acids and hexahydroisoalpha acids. The environment is defined as comprising $H_2$ gas (atmospheric to 2000 psi) along with a hydrogenation catalyst; a pH of 8–12; an alkaline earth metal salt such as $MgCl_2$ or $CaCl_2$ wherein the amount added is typically about 1% to 5% relative to alpha-acids.

In U.S. Pat. No. 4,758,445 there is described a process for the production of isohumulones from a hop extract wherein the hop extract is first mixed with an aqueous solution to obtain a two-phase system. The aqueous phase is then separated and the humulones are precipitated by the addition of an alkaline earth metal salt; the alkaline earth metal humulates are then isomerized to the corresponding alkaline earth metal-isohumulate by subjecting to elevated temperatures (around 100° C.) and a humidity of 90–98% over a period of 5 min to 6 hours.

In U.S. Pat. No. 4,123,561 there is reported a method of processing hops for brewing in which the hops or hops extracts are mixed with metallic oxides, such as CaO or MgO, wherein the metallic oxides are present in the amount of 1–3% by weight of the hops powder (the powder containing 9–21% alpha-acid), at a temperature of 70°–90° C., for a period of 25–30 minutes.

In U.S. Pat. No. 4,002,683 there is reported a process for transforming an alpha acid into an iso-alpha acid involving contacting the alpha acid with an aqueous solution of a metal ion (.e.g. magnesium chloride or calcium chloride ). More particularly , the alpha-acids are first placed in water followed by the addition of ethylene chloride and calcium chloride wherein the pH is adjusted to about 11.0–11.6. This basic solution is allowed to stand overnight while the isomerization takes place.

In U.S. Pat. No. 3,952,061 there is reported the isomerization of humulone-containing material being accelerated upon the addition of a salt of a bivalent metal, e.g. magnesium sulfate, wherein a stoichiometric amount or an excess of the salt is described as assuring complete isomerization. The other reaction conditions are described as including a pH of 4–8; temperature of 50° C. and up to the boiling point of the mixture; at a time up to 15 minutes.

In U.S. Pat. No. 3,765,903 there is reported a process for the preparation of an isomerized hop extract which comprises adding to a solution of humulones or their salts a metal ion of calcium, magnesium, nickel, manganese or zinc, which metal is described as forming a metal-ion humulone complex which precipitates from the solution. This complex is then heated to provide a metal-ion-isohumulone complex which is substantially insoluble and used as a bittering agent, without regeneration to a soluble salt of isohumulone.

In British Patent No. 1,424,785 there is described a method for the isomerization of alpha-acids which comprises contacting a solution of hop extract containing alpha-acids, dissolved in a mixture of water-immiscible organic solvent, and a water-miscible solvent, with an oxide, hydroxide or carbonate of an alkaline earth metal (calcium, magnesium, zinc, strontium or barium), wherein the alkaline earth metal salt is present in equivalent molar quantity to the alpha-acids.

In British Patent No. 1,158,697 there is described a process for the isomerization of humulone to isohumulone by catalytic acceleration with $MgCl_2$ wherein the molar ratio of salt to alpha-acid is 3:1; at a pH below 9.0; at temperatures of 50° C. to the boiling point of the solutions; and for a time of about 15 minutes.

In British Patent No. 1,4 23,129 it is reported that alpha-acids can be isomerized in solution by the action of bases, e.g. oxides or hydroxides or carbonates of alkaline earth metals. It is stated therein that the isomerization employs such bases, not as catalysts, but as substantially stoichiometric reagents.

Other background art, recognizing the importance of isomerization, but not directly utilizing alkaline earth metal salts, is described in U.S. Pat. Nos. 4,302,479; 3,949,092; and 3,607,300.

Accordingly, as can be seen from the above, there is a variety of useful methods now reported to transform alpha-acids in hops or hops extract to the desired hop flavor (i.e. the iso-alpha acid) in the presence of an alkaline earth metal or earth metal salt. Nevertheless, there is a continuing effort to improve on the yield of iso-alpha acid so produced by careful adjustment of the combined reaction variables: temperature, time, pH and the stoichiometric ratio of alkaline earth metal to the starting alpha-acid compound.

It is therefore an object of this invention to develop a process of producing a pre-isomerized hop extract, or an isomerized resin extract (IRE) that is fluid, when warmed, that has fewer degradation by-products, and contains the hop oils.

It is also an object of this invention to provide a process in which the iso-alpha acids are produced in higher yields from the alpha acids by a relatively inexpensive and simple method and which uses a solubilized alkali and sub-equivalent amounts of solubilized alkaline earth metal salts.

SUMMARY OF THE INVENTION

The present invention concerns a procedure for the production of iso-alpha-acids from hop extract, preferably obtained by extraction using liquid or supercritical carbon dioxide, or with hexane.

According to the present invention there is provided a method for the production of an isomerised hop preparation which consists essentially of mixing together hop extract with aqueous solutions of an alkaline and an alkaline earth metal compound, and subjecting the resulting mixture to a temperature of at least 70° C. for a time sufficient to affect conversion of alpha-acid to iso-alpha-acid.

The alkali may be, for instance, sodium hydroxide, sodium carbonate, potassium hydroxide, or potassium carbonate. Particularly preferred alkaline earth compounds include magnesium sulfate, magnesium chloride and calcium chloride. Preferably, the alkaline earth metal compound is used in an amount wherein the mole ratio of alkaline compound to alpha-acid is between 0.1 to 0.5, preferably 0.2 to 0.4, and most preferably 0.2 to 0.3.

Preferably, the mixture of extract, alkali and alkaline earth metal compound is maintained at a temperature in the range of 70° to 125° C., more preferably 70° to 100° C., for a time sufficient to complete the isomerization process. The most preferred temperature is about 75° to 85° C. The mixture is maintained at the preferred temperature for a period which is preferably in the range of 1 to 5 hours. A more preferred period is 1 to 3 hours.

Preferably, the mixture of extract, alkali and alkaline earth metal compound is maintained at a pH just under 10.0, preferably between about 8.0 to 9.6.

In accordance with the above process, hop extract containing 52% alpha-acids have been treated with sodium hydroxide to a pH of 9.5. An aqueous solution of magnesium sulfate (1.0–2.0 molar) is combined with the alpha-acids wherein the mole ratio of magnesium sulfate to alpha-acid is in the range of 0.1 to 0.5, preferably 0.2 to 0.3. Accordingly, 94.4% of the alpha-acids are converted to iso-alpha-acids and the overall yield of iso-alpha-acids and alpha-acids is about 97 to 98%. By careful control of the pH within the ranges listed above, both the percent conversion and the percent yield of alpha-acids of iso-alpha-acids are controlled, and the stability of the extract can be maintained over longer periods of time.

DETAILED DESCRIPTION OF THE INVENTION

Liquid or supercritical $CO_2$ or hexane extract, that has been pre-heated, is added to hot water and is stirred. The speed of the stirrer should be adjusted so that small resin droplets are formed. Tap water may be used instead of deionized water if the concentration of iron or other heavy metals, are low. The volume of water used is about 1.0 to 4.0 and preferably 1.5 to 3.0 times the mass of $CO_2$ extract. Larger amounts of water are generally unnecessary. A concentrated solution of alkali, such as sodium hydroxide or potassium hydroxide or sodium carbonate or potassium carbonate is added until reaching a pH in the range of about 8.0 to values just under 10.0 preferably in the range of about 8.2 to 9.6. It is important to this invention to keep the pH below about 10, or else the finished IRE might have an unacceptable aroma. Next a solution of alkaline-earth salt is added. The preferred alkaline-earth salts include magnesium sulfate, magnesium chloride and calcium chloride.

A surprising aspect of this invention is that only about 0.1 to 0.5, preferably 0.2 to 0.3 moles of alkaline-earth salt per mole of alpha acid are needed to significantly improve the final product in terms of the yield of iso-alpha acids and the amount of degradation compounds and hop oil. Greater amounts of alkaline earth salts cause only a small improvement of the IRE, at the expense of increased cost of the process.

The rate of the isomerization reaction can be controlled by the pH, temperature and the type and amount of alkaline-earth salt. It is best to adjust the reaction conditions such that more than 95% of the alpha acids are isomerized within 1 to 3 hours, or enough time such that the product can be analyzed by HPLC. With increasing molar ratios of alkaline-earth salts, the isomerization reaction can be done at a lower temperature, though at molar ratios between 0.3 to 0.5 the temperature should be at least 70° C. so that the resin is fluid and can be stirred.

The alkaline-earth-resin complex is disassociated by the addition of an acid such as sulfuric or hydrochloric acid. After the acidification step, the upper IRE phase is collected.

An interesting discovery of this invention is that nearly all of the cationic component of the alkaline earth salt (e.g., magnesium) should be removed from the IRE in order to obtain a stable product. The stability of the IRE is dramatically decreased with as little as 0.05% magnesium (0.01 gm atoms of magnesium per mole of iso-alpha acids remaining in the IRE). This discovery is surprising since the prior art such as U.S. Pat. No. 4,123,561 taught that magnesium salts of alpha acids stabilize the alpha acids in hops from deterioration (resulting in greater economy in storage and packaging, as well as longer shelf life).

The IRE obtained by this invention is more fluid, at any given temperature, than the initial $CO_2$ extract. Thus the IRE need not be pre-heated to as high of a temperature, as that of the $CO_2$ extract, when being dosed into the wort. The amount of degradation compounds in the IRE may be as low as 1.4% (estimated by HPLC). The yield of iso-alpha acids and alpha acids may be as high as 98% and recovery of hop oils as high as 85%.

The invention will now be described with reference to the following examples.

EXAMPLE 1

To 1.9 liters of deionized water at 56° C. was added 970 gm of supercritical $CO_2$ extract ( 52.0% alpha acids ); the two phase system was stirred at 470 rpm with a propellor-type blade. Nitrogen was bubbled into all of the sample except 1C and 1F (see Table 1). Nitrogen did not significantly improve the yield of iso-alpha-acids or decrease the amount of degradation compounds. A 50% (w/w) sodium hydroxide solution was added until a pH of 9.5 was reached (pH 9.0 for sample 1E and pH 9.2 for sample 1F ). An aqueous solution of magnesium sulfate was added and the temperature was increased to about 63° C. After adding all of the magnesium sulfate solution, the temperature was increased to the value reported in Table 1. When at least 92% of the alpha acids were isomerized to iso-alpha-acids, 50% (w/w) sulfuric acid was added until reaching a final pH of 1.4 or lower ( see Table 1). While adding sulfuric acid, the temperature was slowly decreased to about 55° C. Stirring was continued for another 30 minutes before allowing the phases to separate. After 4 hours the lower aqueous phase was discarded and the IRE collected.

As can be seen from the results in Table 1, Example I demonstrates that sub-equivalent amounts of magnesium sulfate significantly improves the yield of iso-alpha acids and decreases the amount of degradation compounds, and decreases the loss of hop oil in the IRE.

TABLE 1

Concentration-Dependent Effects of Magnesium Sulfate on the Yield and Quality of IRE.

| Sample | [Mg2SO4] [Alpha Acids] | Isomerization Conditions pH$^a$ | Temp. (C.) | Time (hr.) | Final pH | & Yield of Alpha + Iso-Alpha Acids | % Degradation Compounds$^b$ | c Degree of Isomerization | d % Hop Oil (ml/gm) |
|---|---|---|---|---|---|---|---|---|---|
| 1A | 0 | 9.4 | 91 | 3.0 | 1.4 | 92.5 | 4.1 | 96.3 | 2.6 |
| 1B | 0.1 | 9.3 | 84 | 1.5 | 1.1 | 94.8 | 2.4 | 96.6 | 3.2 |
| 1C | 0.2 | 9.2 | 78 | 1.8 | 1.4 | 96.7 | 1.7 | 96.4 | 3.9 |
| 1D | 0.3 | 9.4 | 76 | 1.0 | 1.1 | 96.4 | 1.6 | 98.7 | 3.9 |
| 1E | 0.3 | 8.5 | 73 | 3.0 | 1.1 | 97.7 | 1.4 | 96.6 | 3.6 |
| 1F | 0.5 | 8.0 | 70 | 0.3 | 1.0 | 97.2 | 1.3 | 93.8 | 3.8 |

$^a$pH of aqueous phase after addition of $Mg_2SO_4$.
$^b$The degradation compounds eluted from a reverse-phase HPLC column before the iso-alpha acids. The extinction coefficient, at 270 nm, was assumed to be identical with that of iso-alpha acids.
c Degree of isomerization = [% iso-alpha acids]/(% alpha acids + % iso-alpha acids).
d The $CO_2$ extract had 4.6% hop oil.

EXAMPLE 2

An amount of 957 gm of hot and fluid liquid $CO_2$ extract was adored to 1.9 liters of tap water at 55° C. The two phase system was stirred with a propeller-type stirrer at 500 rpm. After addition of 100 milliliters of 50% (w/w) sodium hydroxide the pH was 9.1. While adding the 189 milliliters of 1.5 molar magnesium sulfate solution (0.21 moles magnesium sulfate per mole alpha acids ), the temperature was increased to 79 ° C. After 1.2 hours, the temperature was further increased to 82° C. and then maintained for 4 hours. Then 183 milliliters of 50% (w/w) sulfuric acid was added at 220 ml/hour, while the temperature was slowly decreased to 54° C., dropping the pH to 1.7. The sample was stirred at 500 rpm for 30 minutes and then stirred overnight at 60 rpm. An amount of 947 gins of IRE was drained from the stainless steel vessel. The yield of iso-alpha+alpha acids was 96.5%, with a degree of isomerization of 96.4% (degree of isomerization=[% Iso-d]/(% alpha acids+% iso-alpha acids)). The IRE contained an estimated 2.3% of pre-iso-alpha acids (degradation compounds) .

As can be seen from the above, Example 2 demonstrates that IRE can be prepared from liquid $CO_2$ extract.

EXAMPLE 3

An amount of 959 gm of hexane extract (50.2% alpha acids and 1.1% iso-alpha acids) was added to 1.8 liter of deionized water at 58° C., bubbled with a stream of nitrogen, and while being stirred at 480 rpm. After adding 102 milliliters of 50% (w/w) sodium hydroxide, the pH was 9.4. The temperature was increased to 66° C. while adding 202 millimeters of 2 Molar magnesium sulfate (0.3 moles magnesium sulfate per mole of alpha and iso-alpha acids) and then increased to 79 ° C. After 1.1 hours at this temperature, 264 milliliters of 50% (w/w) sulfuric acid was added while lowering the temperature to 58° C. The final pH was 0.9. The sample was stirred for another 30 minutes and then allowed to stand for 4 hours. A small amount of the interfacial material was centrifuged and the resin was combined with the rest of the resin phase.

The yield of iso-alpha and alpha acids was 98.5%, with the degree of isomerization of 97.5% and the resin contained an estimated (by HPLC ) 2.6% degradation compounds. By comparison a yield of iso-alpha and alpha acids of only 88.2%, with the degree of isomerization of 95.2%, was obtained from hexane extract isomerized in the absence of magnesium sulfate. This resin contained an estimated 5.0% degradation compounds.

EXAMPLE 4

An amount of 962 gm of supercritical $CO_2$ extract (51.8% alpha acids) was added to 2.0 liters of deionized water at 57° C., bubbled with a stream of nitrogen while being stirred ,it 470 rpm. After the addition of 122 ml of 50% (w/w) sodium hydroxide, the pH was 9.6. While adding 2 molar magnesium chloride solution, at 290 ml/hr, the temperature of the reaction vessel was increased to 65° C. After adding 143 ml of magnesium chloride ([$MgCl_2$]/[alpha acids]=0.20), the pH was 9.3, and then the temperature was increased to 77° C. After 2.2 hours at this temperature , 50% (w/w) hydrochloric acid was added until reaching a pH of 1.2 at 57° C. The sample was stirred for another 30 minutes and then the resin phase was collected after standing for 4 hours.

The yield of iso-alpha acids+alpha acids was 95.8%, with a degree of isomerization of 97.2%. The IRE contained 1.9% of degradation compounds; these compounds eluted from a reverse-phase HPLC column before the iso-alpha acids. The HPLC coefficient of these compounds was assumed to be equal to that of the iso-alpha acids.

EXAMPLE 5

An amount of 989 gm of supercritical $CO_2$ extract (52.0% alpha acids ) was added to 1.9 liters of deionized water at 58° C., bubbled with a stream of nitrogen and while being stirred at 470 rpm. After adding 126 ml of 50% (w/w) sodium hydroxide, pH=9.6, the temperature of the reaction vessel was increased to about 65° C. Then 217 ml of 2M calcium chloride (0.3 moles calcium chloride per mole alpha acids ) was added slowly. The temperature was then increased to 75° C. the pH was 9.3. After 1.9 hours, 50% (w/w) hydrochloric acid was added slowly until the pH was 1.5; the temperature of the suspension was 58° C. The phases were stirred for another 30 minutes and then after standing for 4 hours the IRE was collected.

The yield of iso-alpha acids +alpha acids was 97.4%, with 97.4% isomerization (% isomerization=% iso-alpha acids/(% iso-alpha acids+% alpha acids)). The IRE contained 1.6% of degradation compounds.

EXAMPLE 6

An amount of 967 gm of hot and fluid supercritical $CO_2$ extract (52.2% alpha acids ) was poured into 1.9 liters of deionized water at 56° C., while being stirred at 500 rpm with a propeller-type stirrer. A 50% (w/w) potassium hydroxide solution was pumped into the reaction vessel at 220 ml/hr. After adding 206 ml of the potassium hydroxide solution; the pH was 9.6; and then the temperature was increased to 63° C. 143 ml of 2 molar magnesium sulfate solution (0.2 moles magnesium sulfate per mole alpha acids) was then added at 280 ml/hr. The temperature of the suspension was increased to 79 ° C. the pH was 9.4. After reacting for 4.3 hours, 50% (w/w) sulfuric acid was pumped onto the suspension until the pH was 1.1. The two phase system, at 56° C., was stirred for another 30 minutes. The phases were separated by standing for 4 hours and then the IRE was collected.

The yield of iso-alpha acids+alpha acids was 94.2%, with a degree of isomerization of 97%. The IRE had 2.6% of degradation compounds.

EXAMPLE 7

To 900 milliliters of deionized water at 56° C. was added 941 gm of supercritical $CO_2$ extract ( 53.0% alpha acids). The mixture was stirred with a propellor-type stirrer at 490 rpm while 1.3 liters of sodium carbonate was added slowly to bring the pH to 9.3. While adding a total of 209 milliliters of 2 Molar magnesium sulfate (0.3 moles magnesium sulfate per mole of alpha acids), the temperature was increased to 66° C. Then the temperature of the mixture was brought to 77° C. After 1.5 hours, a solution of 50% (w/w) sulfuric acid was pumped onto the reaction mixture until the pH was 1.0; a total of 542 millimeters was added. Concurrently the temperature was decreased to 58° C. After stirring for another 30 minutes and standing for 4 hours, the resin phase was collected.

The yield of iso-alpha and alpha acids was 98.3% with the degree of isomerization of 96.5%. The resin contained an estimated (by HPLC) 1.5% degradation compounds.

EXAMPLE 8

Three IRE were prepared by the following procedure:

To 1.9 liters of deionized water at 56° C. was added 980 gm of supercritical $CO_2$ extract (52.0% alpha acids). The mixture was stirred with a propeller-type stirrer at 500 rpm and 123 milliliters of 50% (w/w) sodium hydroxide was added to bring the pH to 9.5. The temperature was increased to 63° C. while adding a total of 143 milliliters of 2 molar magnesium sulfate solution. The temperature was increased to 77° C., the pH was 9.2. After 1.8 hours the temperature was slowly lowered to 56° C. while adding 50% (w/w) sulfuric acid. The volumes of sulfuric acid added were 201, 224 and 270 ml to produce IRE samples 8A, 8B and 8C, respectively. After each addition of sulfuric acid, stirring was continued for another 30 minutes, and then the phases were allowed to separate by standing for 4 hours. The pH of the aqueous phases were 1.8 , 1.4 and 1.1, respectively. Samples of the IRE were taken.

Aliquots of the above IRE samples were stored in glass vials for 4 weeks at 60° C. This test was used to estimate the long-term stability of the iso-alpha acids in the IRE preparations. The HPLC results along with the magnesium content of the IRE are presented in Table 2.

TABLE 2

Effect of pH on the magnesium and iron content of IRE and the concentration of iso-alpha acids in the IRE after 4 weeks at 60° C.

| Sample # | pH | & Magnesium | Fe ppm | gm-atoms Mg mole (alpha + Iso-alpha) | Decrease in (% alpha + % Iso-Alpha) |
|---|---|---|---|---|---|
| 8A | 1.8 | 0.046 | 9 | 0.013 | 15.9 |
| 8B | 1.4 | 0.013 | 8 | 0.0038 | 6.3 |
| 8C | 1.0 | 0.005 | 5 | 0.0015 | 4.1 |

As can be seen from the foregoing, the present invention provides an improved process for producing iso-alpha acids, and which overcomes the deficiencies of the prior art. Various changes may be made in the invention without departing from the spirit and scope thereof. It is therefore intended that the invention not be limited by the foregoing description.

I claim:

1. A method for the production of isomerized hop preparation which comprises mixing together a hop extract with a solubilized alkali and an alkaline earth metal compound, wherein the alkaline earth metal compound is selected from the group consisting of magnesium sulfate, magnesium chloride and calcium chloride, and mixtures thereof, and maintaining the resultant mixture at a temperature between 70°-125° C. and a pH under 10 for a time sufficient to effect conversion of the alpha-acid in said hop extract into the iso-alpha acid, wherein the solubilized alkaline earth metal compound comprises an aqueous solution of said compound in a mole ratio of said compound to alpha acid of between 0.1 and 0.5.

2. The method of claim 1, wherein the mole ratio is between 0.2 to 0.3.

3. The method of claim 1, wherein the alkali comprises an inorganic hydroxide.

4. The method of claim 3, wherein the inorganic hydroxide is selected from the group consisting of sodium hydroxide and potassium hydroxide.

5. The method of claim 1, wherein the alkali comprises an inorganic carbonate.

6. The method of claim 5, wherein the inorganic carbonates is selected from the group consisting of sodium carbonate and potassium carbonate.

7. The method of claim 1, wherein the alkaline earth metal compound comprises magnesium sulfate.

8. The method of claim 1, wherein the mixture is maintained at the temperature of at least 70° C. for about 1–5 hours.

9. The method of claim 1, wherein the mixture is maintained at the temperature of about 70°–85° C. for about 1–3 hours.

10. The method of claim 1, wherein the pH is between about 8.0 and 9.6.

11. The method of claim 1, wherein the iso-alpha acids in the hop extract is further treated to remove the cationic component of the alkali or alkaline earth metal compound to stabilize the alpha acids from deterioration.

12. The method of claim 11, wherein said treatment comprises the addition of an inorganic acid to a pH of about 0.9 t o 1.4.

13. A method for the production of isomerized hop preparation which comprises mixing together, in a solvent free environment, a hop extract with an aqueous solution of an alkali, and an aqueous solution of an alkali earth metal compound, wherein the alkaline earth metal compound is selected from the group consisting of magnesium sulfate, magnesium chloride and calcium chloride, and mixtures thereof, wherein the molar ratio of alkaline earth compound to alpha acid is between about 0.2 and 0.3, and maintaining the mixture at a temperature of about 70°–85° C. for about 1–3 hours at a pH between about 8.0 and 9.6 to effect conversion of the alpha acid in the hop extract into the iso-alpha acid.

14. The method of claim 13, wherein the alkali comprises an inorganic hydroxide selected from the group consisting of sodium hydroxide and potassium hydroxide, or selected from the group consisting of sodium carbonate and potassium carbonate.

15. The method of claim 13, wherein the alkaline earth metal compound is selected from the group consisting of magnesium sulfate, magnesium chloride and calcium chloride.

16. The method of claim 13, wherein the iso-alpha acids in the hop extract is further treated to remove the cationic component of the alkali and alkaline earth metal compound to stabilize the alpha acids and deterioration.

17. The method of claim 16, wherein said treatment comprises the addition of an inorganic acid to a pH of about 0.9 to 1.4.

* * * * *

UNITED STATES PATENT AND TRADEMARK OFFICE
CERTIFICATE OF CORRECTION

PATENT NO. : 5,370,897
DATED : December 6, 1994
INVENTOR(S) : Smith et al

It is certified that error appears in the above-indentified patent and that said Letters Patent is hereby corrected as shown below:

Claim 12, Col. 9, line 23 "t o" should be --to--

Signed and Sealed this

Eighteenth Day of April, 1995

Attest:

BRUCE LEHMAN

*Commissioner of Patents and Trademarks*

*Attesting Officer*